United States Patent
Kodama

(10) Patent No.: US 8,355,584 B2
(45) Date of Patent: Jan. 15, 2013

(54) IMAGE PROCESSING APPARATUS, IMAGE PROCESSING METHOD, AND COMPUTER PROGRAM PRODUCT

(75) Inventor: Taku Kodama, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 887 days.

(21) Appl. No.: 12/453,417

(22) Filed: May 11, 2009

(65) Prior Publication Data

US 2009/0279795 A1 Nov. 12, 2009

(30) Foreign Application Priority Data

May 12, 2008 (JP) ................................. 2008-124778

(51) Int. Cl.
 *G06K 9/36* (2006.01)
(52) U.S. Cl. ...................................................... 382/232
(58) Field of Classification Search .................. None
 See application file for complete search history.

(56) References Cited

U.S. PATENT DOCUMENTS

| | | | |
|---|---|---|---|
| 6,597,739 B1 * | 7/2003 | Li et al. ...................... | 375/240.19 |
| 7,006,697 B1 * | 2/2006 | Gormish et al. ............... | 382/234 |
| 7,224,844 B2 * | 5/2007 | Otsuka ........................... | 382/239 |
| 7,245,775 B2 | 7/2007 | Kodama et al. | |
| 7,293,172 B2 | 11/2007 | Nishimura et al. | |
| 7,333,663 B1 * | 2/2008 | Schumacher ................. | 382/240 |
| 7,336,852 B2 | 2/2008 | Nomizu et al. | |
| 7,352,908 B2 | 4/2008 | Kodama | |
| 7,369,161 B2 * | 5/2008 | Easwar et al. ............. | 348/222.1 |
| 7,394,470 B2 | 7/2008 | Nishimura et al. | |
| 7,430,327 B2 | 9/2008 | Kodama et al. | |
| 7,450,770 B2 * | 11/2008 | Chen et al. ..................... | 382/234 |
| 7,450,773 B2 | 11/2008 | Nomizu et al. | |
| 7,454,069 B2 | 11/2008 | Kodama et al. | |
| 7,580,577 B2 * | 8/2009 | Enokida et al. ............... | 382/232 |
| 7,583,844 B2 * | 9/2009 | Fehmi et al. .................. | 382/232 |
| 7,613,345 B2 * | 11/2009 | Kajiwara et al. .............. | 382/232 |
| 7,760,948 B1 * | 7/2010 | Rissa ............................. | 382/232 |
| 7,836,116 B1 * | 11/2010 | Goodnight et al. ........... | 708/404 |
| 2003/0035476 A1 * | 2/2003 | Ohyama et al. ............. | 375/240.1 |
| 2003/0108247 A1 * | 6/2003 | Acharya et al. ............... | 382/240 |
| 2004/0100654 A1 | 5/2004 | Kodama et al. | |
| 2004/0109186 A1 * | 6/2004 | Shindoh et al. .............. | 358/1.13 |
| 2004/0177155 A1 * | 9/2004 | Enokida et al. ............... | 709/236 |
| 2004/0202371 A1 | 10/2004 | Kodama et al. | |

(Continued)

FOREIGN PATENT DOCUMENTS

JP 2004-242273 8/2004

(Continued)

OTHER PUBLICATIONS

Abstract of JP 2000-293674 published on Oct. 20, 2000.

(Continued)

*Primary Examiner* — Samir Ahmed

(74) *Attorney, Agent, or Firm* — Harness, Dickey & Pierce, P.L.C.

(57) ABSTRACT

An image processing apparatus generates code data by connecting a plurality of first compressed codes output from one or more threads. The image processing apparatus includes a compressing unit that compresses image data by using the threads corresponding to divided compression processes; an identification-information attaching unit that attaches identification information to the first compressed codes thereby generating second compressed codes; and a code-data generating unit that generates code data including the second compressed codes.

14 Claims, 10 Drawing Sheets

U.S. PATENT DOCUMENTS

| | | |
|---|---|---|
| 2004/0208379 A1 | 10/2004 | Kodama et al. |
| 2004/0212843 A1 | 10/2004 | Kodama et al. |
| 2004/0218817 A1 | 11/2004 | Kodama et al. |
| 2005/0074172 A1 | 4/2005 | Kodama |
| 2005/0117808 A1* | 6/2005 | Sato .............................. 382/234 |
| 2005/0129323 A1* | 6/2005 | Glickman ..................... 382/240 |
| 2005/0135688 A1* | 6/2005 | Chen et al. .................... 382/240 |
| 2007/0076962 A1 | 4/2007 | Kodama |
| 2007/0110163 A1 | 5/2007 | Kodama |
| 2008/0226186 A1 | 9/2008 | Kodama |
| 2009/0110310 A1 | 4/2009 | Kodama |

FOREIGN PATENT DOCUMENTS

| | | |
|---|---|---|
| JP | 2005-259042 | 9/2005 |
| JP | 3797013 | 4/2006 |
| WO | WO 03/041394 | 5/2003 |

OTHER PUBLICATIONS

"Information Technology—JPEG 2000 image coding system : Core coding system" International Telecommunication Union, ITU-T Recommendation T.800, Aug. 2002.

Japanese Office Action mailed Feb. 21, 2012.

\* cited by examiner

FIG. 7A

| THREAD 0 | COMMAND 0 | COMMAND 1 | COMMAND 2 | COMMAND 3 | COMMAND 4 | COMMAND 5 | COMMAND 6 | COMMAND 7 | COMMAND 8 | COMMAND 9 |
|---|---|---|---|---|---|---|---|---|---|---|

FIG. 7B

| THREAD 0 | COMMAND 0 | COMMAND 1 | COMMAND 2 | COMMAND 3 | COMMAND 4 | COMMAND 5 | COMMAND 6 | COMMAND 7 | COMMAND 8 | COMMAND 9 |
|---|---|---|---|---|---|---|---|---|---|---|
| THREAD 1 | | | | | | | | | | |
| THREAD 2 | | | | | | | | | | |
| THREAD 3 | | | | | | | | | | |

FIG. 7C

| THREAD 0 | COMMAND 0 | COMMAND 1 | COMMAND 2 | COMMAND 3 | COMMAND 4 | COMMAND 9 |
|---|---|---|---|---|---|---|
| THREAD 1 | | | | | COMMAND 5 | |
| THREAD 2 | | | | | COMMAND 6 | |
| THREAD 3 | | | | | COMMAND 7 | |
|  | | | | | COMMAND 8 | |

FIG. 7D

| THREAD 0 | COMMAND 0 | COMMAND 2 | COMMAND 5 |
|---|---|---|---|
| THREAD 1 | COMMAND 1 | COMMAND 6 | COMMAND 9 |
| THREAD 2 | COMMAND 3 | COMMAND 7 | |
| THREAD 3 | COMMAND 4 | COMMAND 8 | |

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority document 2008-124778 filed in Japan on May 12, 2008.

BACKGROUND OF THE INVENTION

1. Field of the Invention

The present invention relates to a technology for image processing.

2. Description of the Related Art

It is know in the art to compress image data to reduce data size. In a conventional technology, a compression process is divided into a plurality of compression processes corresponding to a plurality of threads. This technique allows the image processing to be performed speedily. In recent years, various hardware resources, such as high-speed processors and large capacity memories, have been developed in accordance with advances in the computer technology. A processor has been developed that logically functions as a plurality of processors. Such a processor can execute commands included in a plurality of threads in parallel and perform image processing in a divided manner.

Japanese Patent Application Laid-open No. 2005-259042 discloses a technology for image processing in which a plurality of threads that performs image processing is generated, the generated threads are divided into groups for each process, and processes are assigned to the threads. This technique allows the image processing to be performed speedily.

Japanese Patent No. 3797013 discloses a technology for image processing in which image data is processed with different resolutions by using a plurality of processors. In this technique, if the image data is processed with a higher resolution, a proportion of the processor to be used is increased.

However, the technologies disclosed in Japanese Patent Application Laid-open No. 2005-259042 and Japanese Patent No. 3797013 do not describe a method of connecting a plurality of pieces of processed data output from a plurality of threads or processors.

International Organization for Standardization/International Electrotechnical Commission (ISO/IEC) 15444-1 defines an order in which packets included in code data are connected and contents of header information included in the code data. When connecting compressed codes output from a plurality of threads to one another, it is necessary to rearrange the compressed codes in a predetermined order, or attach predetermined header information to the compressed codes, in order to meet a standard specified by ISO/IEC 15444-1.

However, the act of rearrangement of the compressed codes reduces the advantage of the high speed processing achieved by using a plurality of threads.

SUMMARY OF THE INVENTION

It is an object of the present invention to at least partially solve the problems in the conventional technology.

According to an aspect of the present invention, there is provided an image processing apparatus that generates code data by connecting a plurality of first compressed codes output from one or more threads. The image processing apparatus includes a compressing unit that compresses image data by using the threads corresponding to divided compression processes; an identification-information attaching unit that attaches identification information to the first compressed codes thereby generating second compressed codes; and a code-data generating unit that generates code data including the second compressed codes.

According to another aspect of the present invention, there is provided an image processing method of generating code data by connecting a plurality of first compressed codes output from one or more threads. The image processing method includes compressing image data by using the threads corresponding to divided compression processes; attaching identification information to the first compressed codes thereby generating second compressed codes; and generating code data including the second compressed codes.

According to still another aspect of the present invention, there is provided a computer program product that includes a computer-readable recording medium and a computer program stored on the computer-readable recording medium that when executed on a computer causes the computer to realize the above image processing method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 7A to 7D are schematic diagrams for explaining divided compression processes associated with threads shown in FIG. 6;

DETAILED DESCRIPTION OF THE PREFERRED EMBODIMENTS

Exemplary embodiments of the present invention are explained in detail below with reference to the accompanying drawings.

In the following description, a group of standards included in ISO/IEC 15444 is referred to as "a joint photographic experts group (JPEG) 2000 standard". Although a process of generating code data according to the JPEG 2000 standard is explained in an embodiment described below, the present invention is not limited to such a configuration. The present invention can be applied to any image processing apparatus as long as a compression process is performed on image data to generate a compressed code, header information is added to the compressed code, and compressed codes are connected to one another to generate code data.

Figure 1:
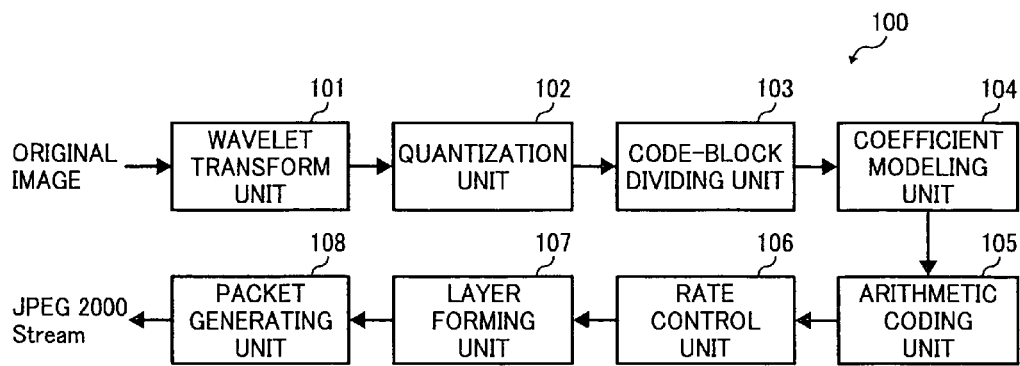
FIG. 1 is a block diagram of an image processing apparatus that generates code data according to a JPEG 2000 standard.

FIG. 1 is a block diagram of an image processing apparatus 100 that generates code data according to the JPEG 2000 standard. An apparatus that generates code data is referred to as an encoder. The image processing apparatus 100 includes a wavelet transform unit 101, a quantization unit 102, a code-block dividing unit 103, a coefficient modeling unit 104, an arithmetic coding unit 105, a rate control unit 106, a layer forming unit 107, and a packet generating unit 108.

The wavelet transform unit 101 performs subband decomposition by discrete wavelet transform (DWT). The quantization unit 102 quantizes transform coefficients output from the wavelet transform unit 101. The code-block dividing unit 103, the coefficient modeling unit 104, and the arithmetic coding unit 105 perform embedded arithmetic coding (hereinafter, "EBCOT"). The rate control unit 106, the layer forming unit 107, and the packet generating unit 108 perform post quantization and code data generation.

The code-block dividing unit 103 divides each quantized subband into square blocks (for example, 64×64) called code blocks. The code blocks are encoded independently.

The coefficient modeling unit 104 performs coefficient modeling on a sequence of wavelet coefficients of each of the code blocks based on bit-planes. Thus, an embedded code string in which coefficient bits are arranged in order of importance is generated. Each of the bit-planes from a most significant bit (MSB) to a least significant bit (LSB) is decomposed into three sub-bit-planes depending on context. The decomposed sub-bit-plane is referred to as a "pass". A boundary between the sub-bit-planes is referred to as a "truncation point" that is the minimum unit of data to be divided when data is truncated afterward.

The arithmetic coding unit 105 performs adaptive arithmetic coding on the embedded code string generated by the coefficient modeling. The rate control unit 106 truncates an arithmetic code string as appropriate in each truncation point, thereby obtaining a target bit rate.

If an image is to be sequentially displayed with a plurality of image qualities, i.e., if a signal-to-noise ratio (SNR) scalability is required, the layer forming unit 107 forms layers of a code. Each of the layers includes a part of an embedded code of the code block. A higher layer includes a component that is more important for reproducing an image.

The packet generating unit 108 decomposes each of the layers into a plurality of units called bodies and adds header information to each of the bodies thereby generating a packet. Each of the bodies has information about a corresponding resolution level. Therefore, the total number of packets to be generated is obtained as a product of the number of the layers and the number of the resolution levels. The header information includes information about a length of the arithmetic code string of each of the code blocks and the number of the sub-bit-planes.

Figure 2:
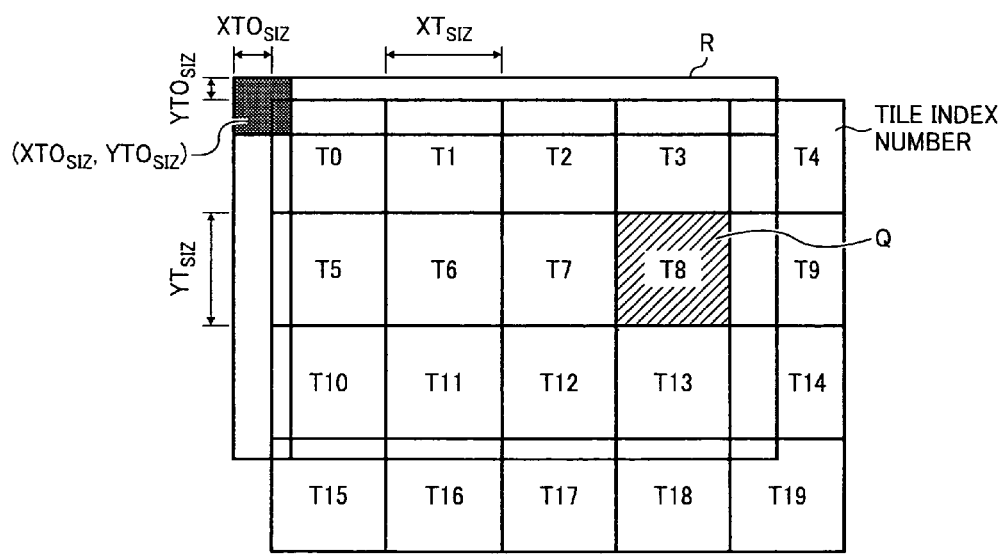
FIG. 2 is a schematic diagram for explaining a relation between image data and tiles according to the JPEG 2000 standard.

FIG. 2 is a schematic diagram for explaining a relation between image data and tiles according to the JPEG 2000 standard. A boundary of the image data is indicated with a rectangle denoted by a reference letter R. The image data is divided into a plurality of rectangles based on coordinates whereby tiles T0 to T19 are formed. The image processing apparatus 100 performs the DWT on each of the tiles T0 to T19 to generate compressed codes and combines the compressed codes thereby generating code data. The tile T8 is denoted by a reference letter Q.

Figure 3:
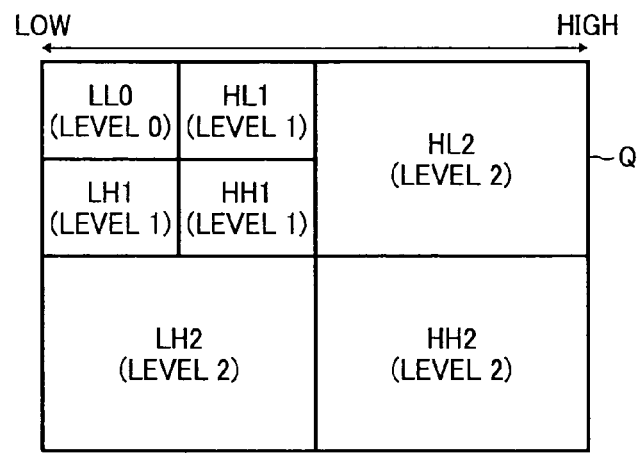
FIG. 3 is a schematic diagram for explaining subbands generated by performing a DWT on an arbitrary tile shown in FIG. 2.

FIG. 3 is a schematic diagram for explaining subbands generated by performing the DWT on the tile T8. In the example of the subband decomposition shown in FIG. 3, a decomposition level of the DWT is two, i.e., the number of the resolution levels is three from level 0 to level 2. Coefficients belonging to a lower resolution level include information on a lower frequency.

Figure 4:
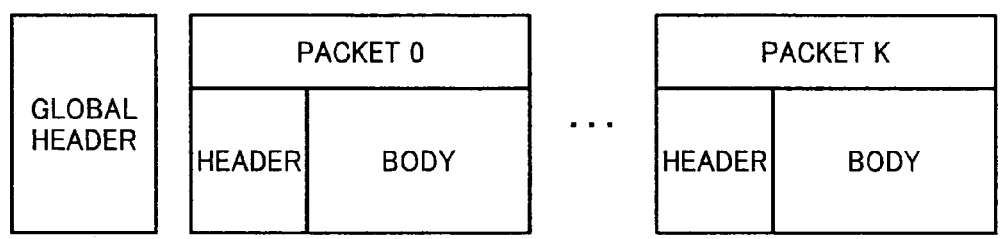
FIG. 4 is a schematic diagram for explaining a structure of the code data.

FIG. 4 is a schematic diagram for explaining a structure of code data. The code data includes a plurality of packets. A final JPEG 2000 code data is obtained by combining all packets in which image data generated by a compression process is included and adding global header information to the packets. In the JPEG 2000 standard, various header information and a sub-bit-plane that is the minimum unit of data to be divided are defined to have a size that is an integral multiple of one byte.

Figure 5:
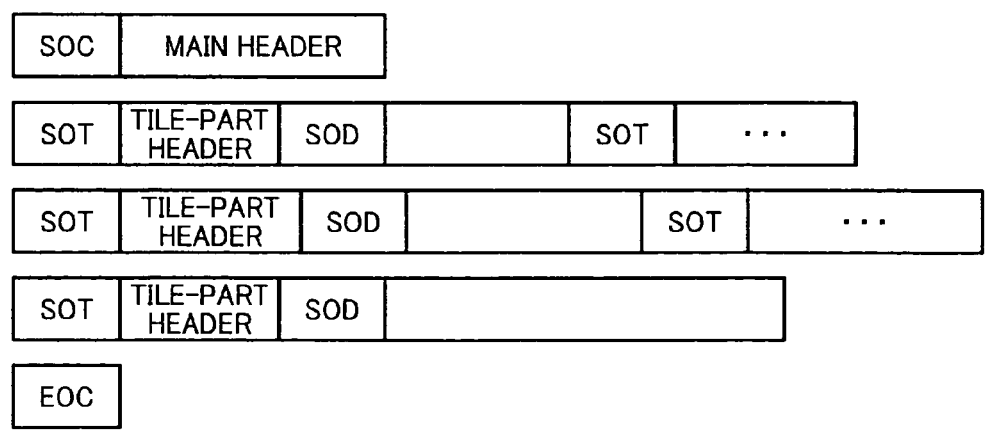
FIG. 5 is a schematic diagram for explaining a structure of the code data in detail.

FIG. 5 is a schematic diagram for explaining a structure of the code data in detail. The code data starts with a start of codestream (SOC) marker indicative of the head of the code data and ends with an end of codestream (EOC) marker indicative of the end of the code data. A parameter related to the whole code data, or the like, is stored in a main header arranged after the SOC marker.

At least one start of tile-part (SOT) marker is arranged for one tile. The SOT marker can be arranged at the head of the tile, or it can be included within the tile. A tile-part header is arranged after the SOT marker arranged at the head of the tile. A parameter related to the whole tile, or the like, is stored in the tile-part header. A start of data (SOD) marker is arranged after the tile-part header. A compressed code is arranged after the SOD marker.

Figure 6:
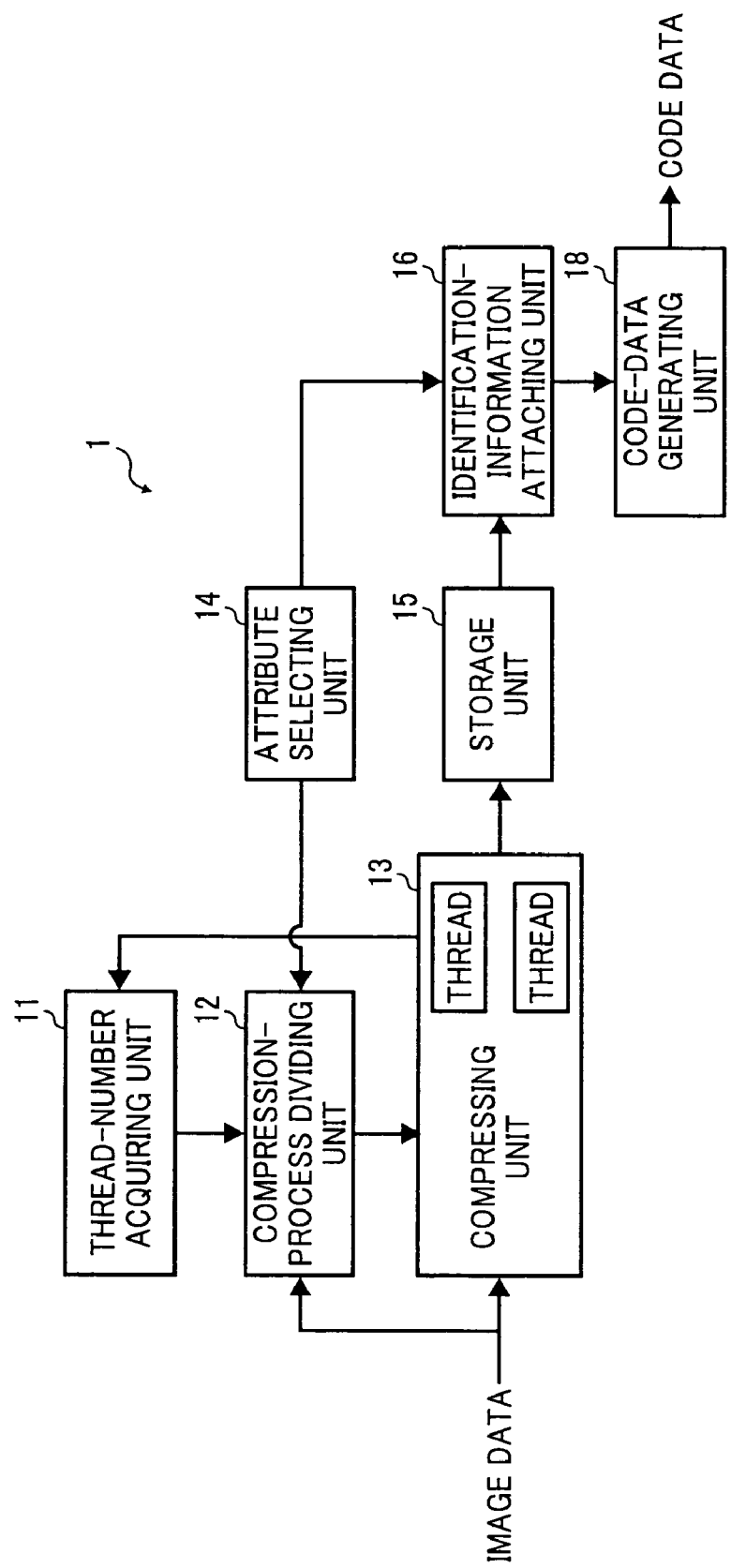
FIG. 6 is a block diagram for explaining a functional configuration of an image processing apparatus according to an embodiment of the present invention.

FIG. 6 is a block diagram for explaining a functional configuration of an image processing apparatus 1 according to an embodiment of the present invention. The image processing apparatus 1 divides a compression process of input image data, allocates the divided processes to a plurality of threads, combines compressed codes output from the threads, and generates code data including the compressed codes.

The image processing apparatus 1 includes a thread-number acquiring unit 11, a compression-process dividing unit 12, a compressing unit 13, an attribute selecting unit 14, a storage unit 15, an identification-information attaching unit 16, and a code-data generating unit 18.

The thread-number acquiring unit 11 acquires the number of threads to be executed in the compressing unit 13. The compression-process dividing unit 12 divides a compression process of input image data into compression processes corresponding to the number of the threads acquired by the thread-number acquiring unit 11. The compression process can be divided based on an attribute, such as a tile, a page, an object, or a color component. Specifically, for example, image data in one tile can be allocated to one thread. Moreover, if a compression process is divided after the DWT is performed, the divided compression processes can be allocated to a plurality of threads based on each precinct.

The compressing unit 13 associates each of the compression processes divided by the compression-process dividing unit 12 with a corresponding one of the threads thereby compressing the image data. The compressing unit 13 is implemented by, for example, a central processing unit (CPU) and a random access memory (RAM) included in a computer, and includes a plurality of threads.

The storage unit 15 stores therein a compressed code output from each of the threads included in the compressing unit 13. The identification-information attaching unit 16 attaches identification information to the compressed code output from the thread. It is preferable that identification information to be attached is generated by the identification-information attaching unit 16.

For example, the identification-information attaching unit 16 can attach identification information to each compressed code output from the thread or attach one piece of identification information to a cluster of compressed codes output from a plurality of threads. In such a case, it is preferable that the compressed codes included in the cluster to which the identification information is attached have the same attribute value. Thus, it is possible to generate code data in the same manner as if all compressed codes are generated by one thread.

The attribute of the compressed code is, for example, a layer, resolution, or a color component in addition to a positional attribute such as a tile or a precinct. If image data includes a plurality of pages, the attribute can be a page. If image data includes a plurality of objects, the attribute can be an object. For example, if a cluster is generated based on resolution, it is possible that the cluster includes compressed codes corresponding to the same resolution.

If the identification-information attaching unit 16 attaches identification information to a cluster of compressed codes, compressed codes having the same attribute value are selected from compressed codes stored in the storage unit 15 whereby a cluster of the compressed codes is generated. Furthermore, if all of compressed codes having the same attribute value are output from one thread, it is possible that the identification-information attaching unit 16 attaches identification information to the head of the compressed codes without storing the compressed codes in the storage unit 15.

The code-data generating unit 18 connects a compressed code to the end of the already generated code data, thereby generating new code data. The compressed code to be connected is a compressed code output from a thread or a compressed code to which identification information is attached by the identification-information attaching unit 16.

The code-data generating unit 18 selects any of the compressed code output from the thread and the compressed code to which the identification information is attached by the identification-information attaching unit 16 based on a relation between a compressed code arranged at the end of the generated code data and the compressed code to be connected, and connects the selected compressed code to the end of the generated code data.

The compressed code arranged at the end of the code data can be a packet arranged at the end or the last compressed code or the last cluster of compressed codes connected to the code data. Moreover, the compressed code arranged at the end of the code data can be a compressed code or a cluster of compressed codes to which one piece of identification information has been attached.

If one piece of identification information is to be attached to a cluster of compressed codes generated by a plurality of threads, the attribute selecting unit 14 selects an attribute that is the same value in compressed codes included in each cluster.

FIGS. 7A to 7D are schematic diagrams for explaining divided compression processes associated with each of threads 0 to 3. Each of the divided compression processes is described as "command", and the compression process is divided into ten processes from command 0 to command 9.

As shown in FIG. 7A, the thread 0 performs all of the compression processes. As shown in FIG. 7B, among the threads 0 to 3, the thread 0 performs all of the compression processes. As shown in FIG. 7C, the thread 0 performs the compression processes corresponding to seven commands (i.e., commands 0, 1, 2, 3, 4, 5, 9), and each of the threads 1 to 3 performs the compression process corresponding to one command (thread 1: command 6; thread 2: command 7; thread 3: command 8). As shown in FIG. 7D, the threads 0 and 1 perform the compression processes corresponding to three commands (thread 0: commands 0, 2, 5; thread 1: commands 1, 6, 9), and the threads 2 and 3 perform the compression processes corresponding to two commands (thread 2: commands 3, 7; thread 3: commands 4, 8).

Figure 8:
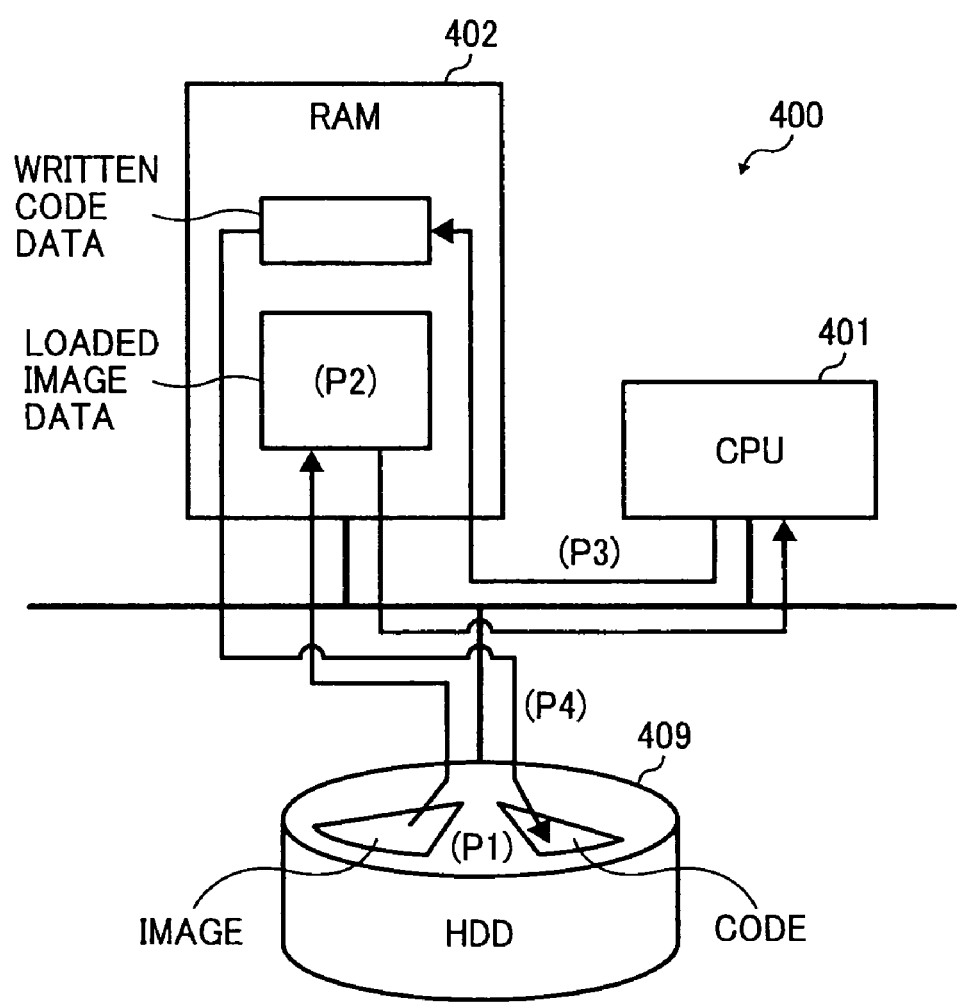
FIG. 8 is a schematic diagram of a computer that functions as the image processing apparatus according to the embodiment.

FIG. 8 is a schematic diagram of a computer 400 that functions as the image processing apparatus 1. The computer 400 includes a CPU 401, a RAM 402, and a hard disk drive (HDD) 409. The CPU 401, the RAM 402, and the HDD 409 are connected to one another via a data bus. The computer can be connected to a drive device of a removable medium such as a digital versatile disc (DVD) or a compact disc (CD).

Image data stored in the HDD 409 is loaded into the RAM 402 in response to a command received from the CPU 401 (see process (P1) in FIG. 8). The CPU 401 reads the image data from the RAM 402, and executes a plurality of threads thereby performing the compression process (see process (P2) in FIG. 8). The CPU 401 writes compressed codes that are asynchronously generated by a plurality of threads in an area of the RAM 402 other than an area in which the loaded image data is stored (see process (P3) in FIG. 8). The CPU 401 sorts the compressed codes written in the RAM and/or attaches identification information such as header information to the compressed codes thereby generating code data, and stores the code data in the HDD (see process (P4) in FIG. 8).

Figure 9:
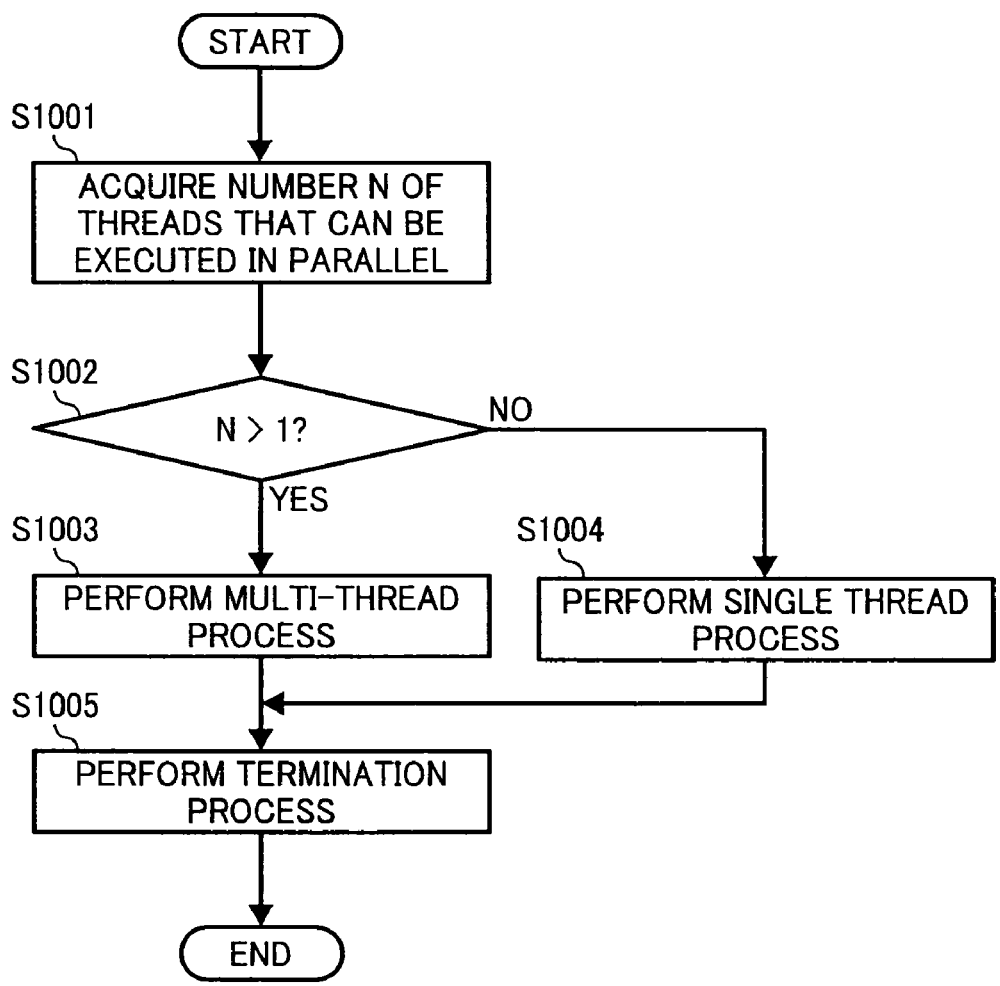
FIG. 9 is a flowchart of an operation performed by the image processing apparatus according to the embodiment for determining whether any of a single thread process and a multi-thread process is to be performed.

FIG. 9 is a flowchart of an operation performed by the image processing apparatus 1 when determining whether any of a single thread process and a multi-thread process is to be performed. It is determined whether any of the single thread process and the multi-thread process is to be performed based on the number of threads that can be executed in parallel.

The thread-number acquiring unit 11 acquires the number N of threads that can be executed in parallel in a computer or the like that performs an encoding process (Step S1001). The thread-number acquiring unit 11 can be implemented by causing a CPU or the like included in the computer to execute a prepared command, or can be implemented by application software, or the like, using the command. Furthermore, the thread-number acquiring unit 11 can be implemented by activating a computer program for determining the appropriate number of threads at Step S1001. Thus, it is possible to seek the number of threads that provides the highest processing capacity.

The compression-process dividing unit 12 determines whether the number N is larger than 1 (Step S1002). If the number N is larger than 1 (Yes at Step S1002), the process control proceeds to Step S1003. If the number N is equal to 1 (No at Step S1002), the process control proceeds to Step S1004.

The compressing unit 13 performs the multi-thread process by using a plurality of threads (Step S1003). On the other hand, the compressing unit 13 performs the single thread process by using one thread (Step S1004). The single thread process is performed in the same manner as a general application program such that a sequence of commands is generated one by one and the CPU is caused to execute the sequence of the commands.

A termination process is performed such that the CPU, or the like, causes a memory used for a running computer program to be released or an access right for a generated code to be released (Step S1005).

Figure 10:
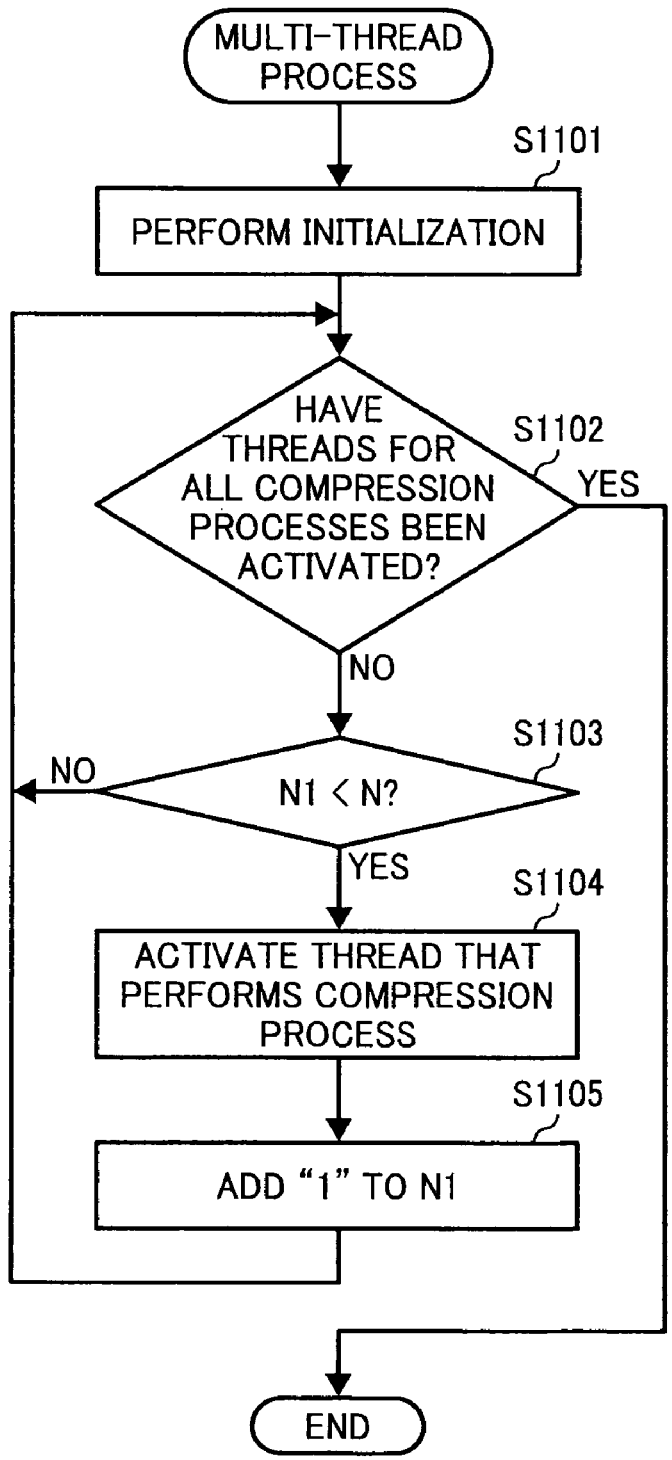
FIG. 10 is a flowchart of an operation performed by the image processing apparatus according to the embodiment for activating the thread in the multi-thread process.

FIG. 10 is a flowchart of an operation performed by the image processing apparatus 1 when activating a thread in the multi-thread process. The operation shown in FIG. 10 is performed at Step S1003 shown in FIG. 9 based on the number N acquired at Step S1001.

Initialization is performed for the multi-thread process (Step S1101). Specifically, the number N1 of threads that are in execution is set to zero. Furthermore, the number NT of, for example, tiles according to the JPEG 2000 standard that can be independently encoded in image data on which the compression process is to be performed is calculated. The number ND of compression processes for which threads have been activated is set to zero.

It is determined whether threads for all compression processes have been activated based on the number NT and the number ND (Step S1102). The number NN of compression processes for which the threads have not been activated is calculated as NN=NT−ND. If the number NN is larger than 1 (No at Step S1102), the process control proceeds to Step S1103, and if the number NN is equal to 0 (Yes at Step S1102), the operation ends.

The compressing unit 13 determines whether a new thread is to be activated based on the number N1 and the number N (Step S1103). If the number N1 is smaller than the number N (Yes at Step S1103), it is determined that the new thread is to be activated and the process control proceeds to Step S1104. If the number N1 is equal to or larger than the number N (No at Step S1103), the process control returns to Step S1102.

The compressing unit 13 activates a thread that performs the compression process based on the number N1 (Step S1104). The compressing unit 13 then adds the number of the thread activated at Step S1104 to the number N1, i.e., adds "1" to the number N1 (Step S1105). Then, the process control proceeds to Step S1102.

Figure 11:
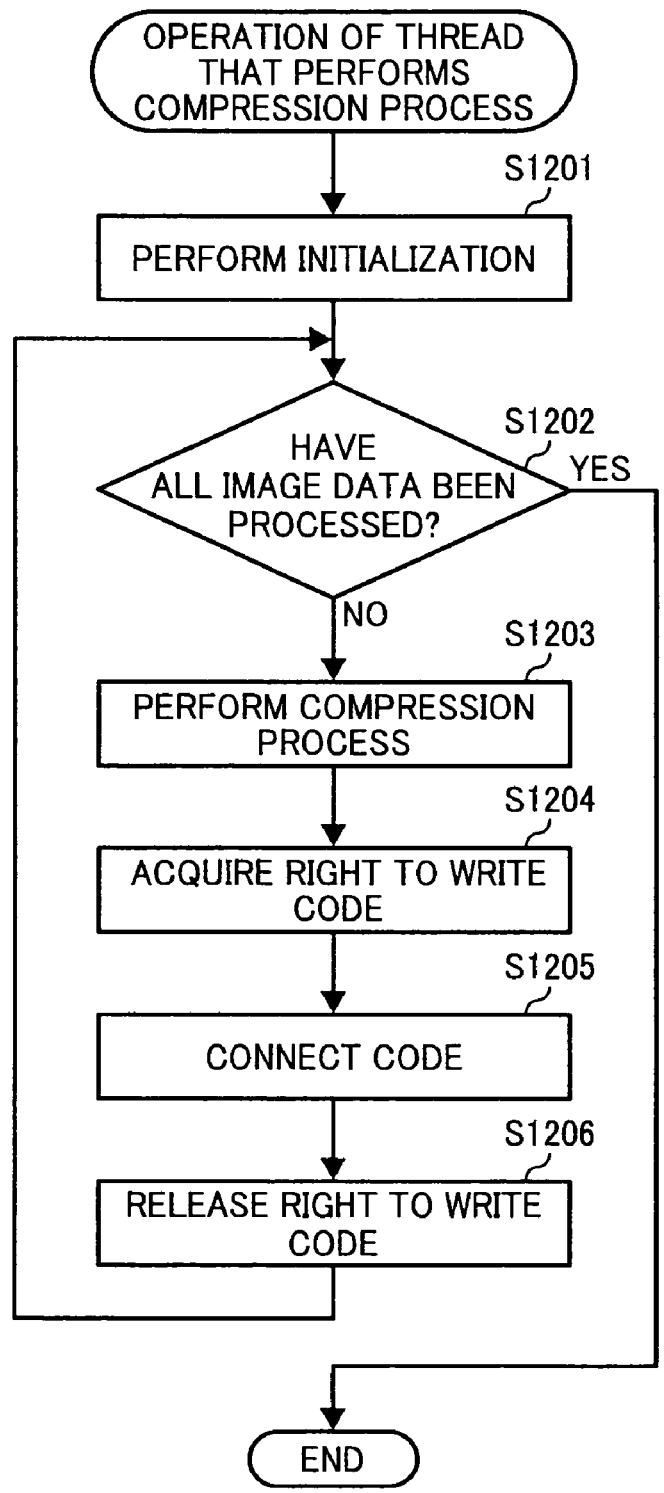
FIG. 11 is a flowchart of an operation performed by the image processing apparatus according to the embodiment for connecting a compressed code to code data.

FIG. 11 is a flowchart of an operation performed by the image processing apparatus 1 when connecting a compressed code output from a thread to code data. The operation shown in FIG. 11 is performed subsequent to the operation shown in FIG. 10. Initialization is performed prior to the compression process (Step S1201). For example, an operation performed for the initialization includes an operation of reserving a memory area or a buffer area used for the compression process or the like, an operation of clearing unnecessary data from a buffer area, an operation of reading image data to be encoded, and an operation of specifying settings on a pointer for an area in which image data is stored.

It is determined whether all image data to be encoded has been processed (Step S1202). If all image data has been processed (Yes at Step S1202), the operation ends. If all image data has not been processed (No at Step S1202), the process control proceeds to Step S1203.

The thread activated at the operation shown in FIG. 10 performs the compression process on the image data to be encoded (Step S1203). The code-data generating unit 18 acquires an access right to access code data that has been already generated and stored in the memory (Step S1204). The access right is a right to write a code on which the compression process has been performed by the thread. The access right is acquired for each thread. If the access right is retained by a different thread, the code-data generating unit 18 stands by while polling is performed until the code-data generating unit 18 acquires the access right.

The code-data generating unit 18 connects a compressed code to the already generated code data (Step S1205). The compressed code to be connected is a compressed code in which the SOT marker is attached to its head by the identification-information attaching unit 16 or a compressed code output from the thread. If the code-data generating unit 18 connects the compressed code output from the thread to the code data, the code-data generating unit 18 updates identification information included in the code data. For example, the code-data generating unit 18 updates information about a data size contained in the tile-part header included in the identification information. Specifically, a data size included in the updated identification information corresponds to a data size obtained by adding a data size of the compressed code connected to the code data to the data size included in the identification information before the identification information is updated.

The code-data generating unit 18 releases the access right (Step S1206), and then the process control returns to Step S1202.

Although the compression process is divided for each tile in the example of the operation shown in FIG. 11, if the compression process is divided based on a different attribute, the identification-information attaching unit 16 attaches a marker or the like corresponding to the attribute to the compressed code.

Figure 12:
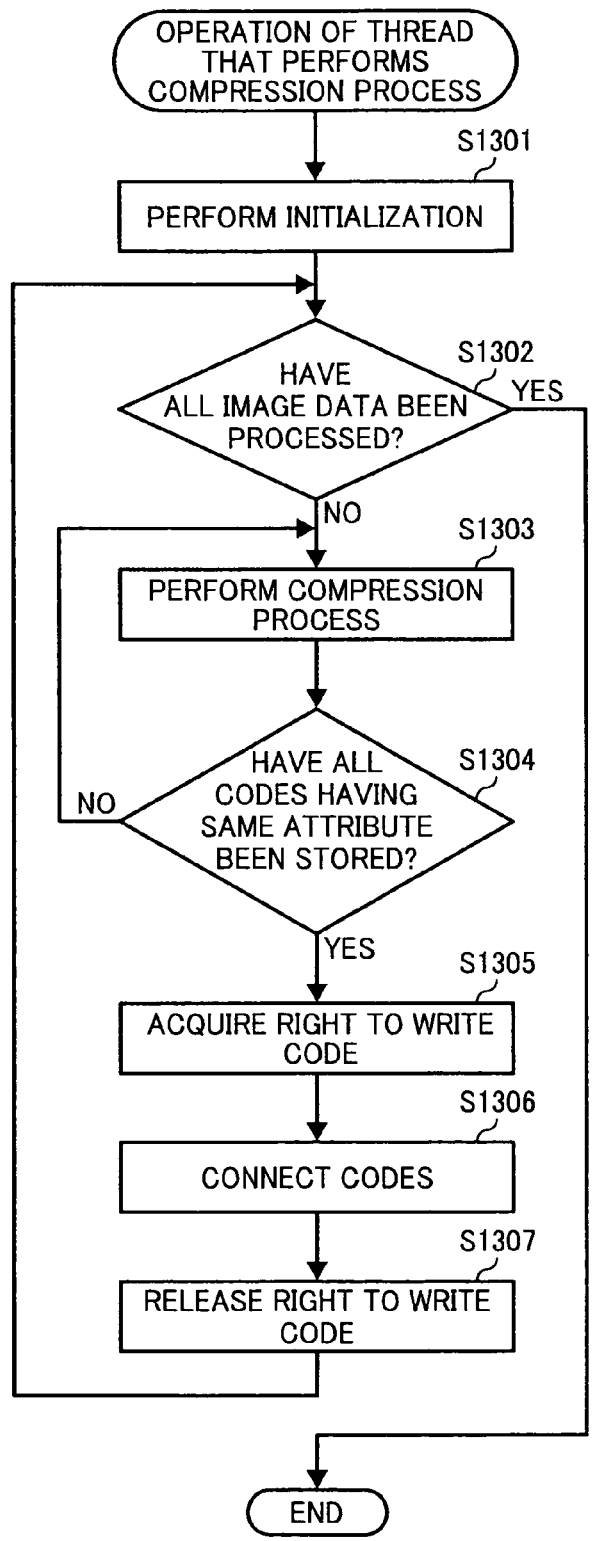
FIG. 12 is a flowchart of an operation performed by the image processing apparatus according to the embodiment for attaching identification information to a cluster of compressed codes.

FIG. 12 is a flowchart of an operation performed by the image processing apparatus 1 when attaching identification information to a cluster of compressed codes having the same attribute and connecting the cluster to code data. Initialization is performed for a thread that performs the compression process (Step S1301). For example, an operation performed for the initialization includes an operation of reserving a memory area or a buffer area used for the compression process or the like, an operation of clearing unnecessary data from a buffer area, an operation of reading image data to be encoded, and an operation of specifying settings on a pointer for an area in which image data is stored.

It is determined whether all image data to be encoded has been processed (Step S1302). If all image data has been processed (Yes at Step S1302), the operation ends. If all image data has not been processed (No at Step S1302), the process control proceeds to Step S1303.

The thread activated at the operation shown in FIG. 10 performs the compression process on image data to be encoded (Step S1303). A compressed code generated by the thread is stored in the storage unit 15. The identification-information attaching unit 16 determines whether all compressed codes having the same attribute have been stored in the storage unit 15 (Step S1304). If all compressed codes having the same attribute have been stored in the storage unit 15 (Yes at Step S1304), the compressed codes are defined as one cluster and the process control proceeds to Step S1305. If all compressed codes having the same attribute have not been stored in the storage unit 15 (No at Step S1304), the process control proceeds to Step S1303.

The code-data generating unit 18 acquires an access right to access the code data that has been already generated and stored in the memory (Step S1305). The access right is acquired for each thread. If the access right is retained by a different thread, the code-data generating unit 18 stands by while polling is performed until the code-data generating unit 18 acquires the access right.

The code-data generating unit 18 connects the cluster of the compressed codes to the already generated code data (Step S1306). The cluster to be connected is a cluster of compressed codes in which the SOT marker is attached to its head by the identification-information attaching unit 16 or a cluster of compressed codes output from the thread.

If the code-data generating unit 18 connects the cluster of the compressed codes output from the thread to the code data, the code-data generating unit 18 updates the identification information included in the code data. For example, the code-data generating unit 18 updates information about a data size contained in the tile-part header included in the identification information. Specifically, a data size included in the updated identification information corresponds to a data size obtained by adding a data size of the cluster connected to the code data to the data size included in the identification information before the identification information is updated.

The code-data generating unit 18 releases the access right (Step S1307), and then the process control returns to Step S1302.

Figure 13:
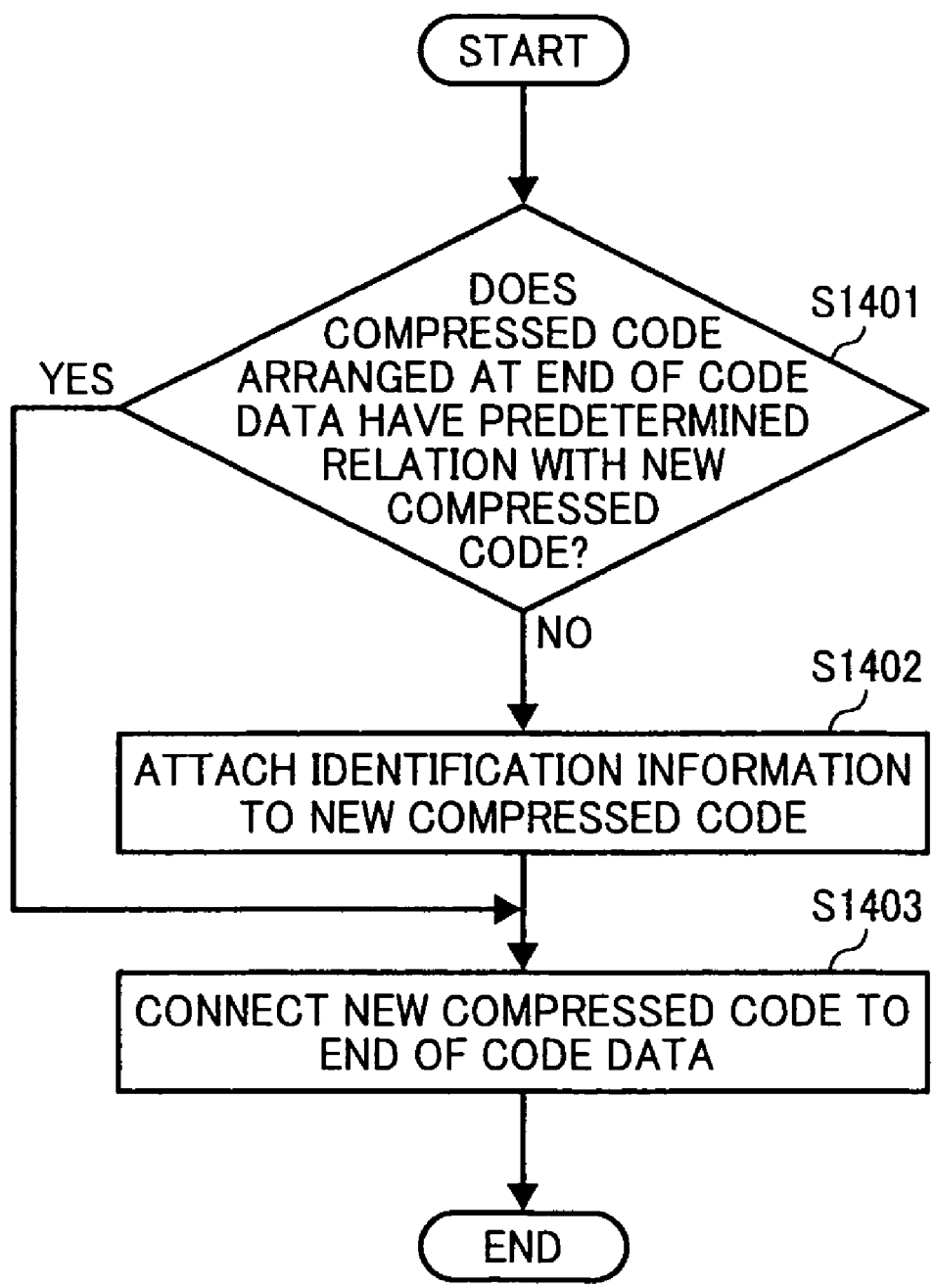
FIG. 13 is a flowchart of an operation performed by the image processing apparatus according to the embodiment for determining whether identification information is to be attached to the compressed code.

FIG. 13 is a flowchart of an operation performed by the image processing apparatus 1 when determining whether identification information is to be attached to a compressed code that is to be connected to code data. The code-data generating unit 18 determines whether a compressed code arranged at the end of the already generated code data has a predetermined relation with a new compressed code to be connected to the code data (Step S1401). If they have the predetermined relation with each other (Yes at Step S1401), the process control proceeds to Step S1403. If they do not have the predetermined relation with each other (No at Step S1401), the process control proceeds to Step S1402.

The predetermined relation is satisfied such that, if code data is generated based on the JPEG 2000 standard, a default occurrence order defined by one progressive order is satisfied. Thus, if a compressed code is connected to the code data in the default occurrence order, a compressed code to which identification information is not attached is connected to the code data. Therefore, the code data can be generated in the same manner as if all compressed codes are generated by one thread. Thus, it is possible to minimize identification information included in the compressed code. The default occurrence order is also referred to as a standard alignment order.

The identification-information attaching unit 16 attaches identification information to the new compressed code output from the thread (Step S1402). The identification information includes, for example, a data size of the compressed code. Furthermore, the compressed code to which the identification information is attached can be a cluster of compressed codes output from one or more threads. It is preferable that the compressed codes included in the cluster have the same attribute.

The code-data generating unit 18 connects the new compressed code to the end of the code data (Step S1403). Because the operation performed at Step S1403 is the same as that performed by the code-data generating unit 18 at Step S1205 shown in FIG. 11, the explanation about the operation performed at Step S1403 is omitted.

The image processing apparatus according to the embodiment includes a control device such as a CPU, a memory device such as a read-only memory (ROM) and a RAM, an external memory device such as an HDD and a CD drive device, a display device, and an input device such as a keyboard and a mouse, and the image processing apparatus can have the hardware configuration in which a generally used computer is employed.

A computer program executed by the image processing apparatus can be stored, in a form of a file that is installable and executable on a computer, in a recording medium readable by the computer, such as a compact disk-read only memory (CD-ROM), a flexible disk (FD), a CD recordable (CD-R), and a DVD.

Alternatively, the computer program can be stored in another computer connected to the computer via a network such as the Internet, and downloaded to the computer via the network. Furthermore, the computer program can also be provided or distributed through a network such as the Internet. The computer program can also be provided such that the computer program is previously incorporated in ROM or the like.

The computer program has a module configuration including the respective units shown in FIG. 6. As actual hardware, the CPU (processor) reads the computer program from the recording medium and executes the read computer program to load the units into a main storage so that the units are generated on the main storage.

According to an aspect of the present invention, it is possible to connect compressed codes output from a plurality of units that perform divided image processes at a high speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus to generate code data by connecting a plurality of first compressed codes output from one or more threads, the image processing apparatus comprising:

a compressing unit to compress image data by using the threads corresponding to divided compression processes;

an identification-information attaching unit to attach identification information to the first compressed codes a determining unit to determine whether a second compressed code arranged at an end of already generated code data and a first compressed code output from one of the threads is in a predetermined relation;

a connecting unit to generate, if the second compressed code arranged at the end of the already generated code data and the first compressed code output from the thread is in the predetermined relation, code data by connecting the first compressed code to the end of the already generated code data, and to generate, if the second compressed code arranged at the end of the already generated code data and the first compressed code output from the thread is not in the predetermined relation, code data by connecting the first compressed code attached, by the identification-information attaching unit, with the identification information to the end of the already generated code data.

2. The image processing apparatus according to claim 1, wherein the compressing unit includes the threads, and each of the threads corresponds to one or more compression processes out of the divided compression processes.

3. The image processing apparatus according to claim 1, wherein the predetermined relation conforms to a rule of an order at which codes included in the already generated code data are aligned.

4. The image processing apparatus according to claim 1, wherein when the connecting unit connects the first compressed code to the already generated code data, the connecting unit updates information indicative of data size included in identification information of a compressed code included in the already generated code data.

5. The image processing apparatus according to claim 1, wherein the identification-information attaching unit is configured to attach identification information to a cluster including a plurality of compressed codes having a same attribute value.

6. The image processing apparatus according to claim 5, further comprising a storage unit to store therein the first compressed codes, wherein
the identification-information attaching unit attaches one piece of identification information to each cluster including a plurality of compressed codes having a same attribute value out of the first compressed codes stored in the storage unit.

7. The image processing apparatus according to claim 5, wherein compressed codes output from one of the threads have a same attribute value.

8. The image processing apparatus according to claim 5, further comprising an attribute selecting unit that selects an attribute, wherein
each of the compressed codes has one or more attributes, the attribute selecting unit selects one of the attributes, and
the identification-information attaching unit attaches one piece of identification information to a cluster including a plurality of compressed codes having a same value of the one selected by the attribute selecting unit.

9. The image processing apparatus according to claim 1, further comprising a compression-process dividing unit to divide a compression process to be performed on the image data thereby generating divided compression processes, wherein
the compressing unit associates a corresponding one of the threads with each of the divided compression processes.

10. The image processing apparatus according to claim 1, wherein code data generated by the code-data generating unit is in conformity to a JPEG 2000 standard.

11. The image processing apparatus according to claim 10, wherein the identification information is a start of tile-part marker.

12. An image processing method of generating code data by connecting a plurality of first compressed codes output from one or more threads, the image processing method comprising:
compressing, by a compressing unit, image data by using the threads corresponding to divided compression processes;
attaching, by an identification-information attaching unit, identification information to the first compressed codes
determining whether a second compressed code arranged at an end of already generated code data and a first compressed code output from one of the threads is in a predetermined relation;
generating, if the second compressed code arranged at the end of the already generated code data and the first compressed code output from the thread is in the predetermined relation, code data by connecting the first compressed code to the end of the already generated code data, and generating, if the second compressed code arranged at the end of the already generated code data and the first compressed code output from the thread is not in the predetermined relation, code data by connecting the first compressed code attached, by the identification-information attaching unit, with the identification information to the end of the already generated code data.

13. The image processing method according to claim 12, wherein
the compressing unit includes the threads, and
each of the threads corresponds to one or more compression processes out of the divided compression processes.

14. A non-transitory computer-readable recording medium including a computer program that when executed on a computer causes the computer to realize an image processing method of generating code data by connecting a plurality of first compressed codes output from one or more threads, the computer program causing the computer to execute:
compressing image data by using the threads corresponding to divided compression processes;
attaching, by an identification-information attaching unit, identification information to the first compressed codes
determining whether a second compressed code arranged at an end of already generated code data and a first compressed code output from one of the threads is in a predetermined relation;
generating, if the second compressed code arranged at the end of the already generated code data and the first compressed code output from the thread is in the predetermined relation, code data by connecting the first compressed code to the end of the already generated code data, and generating, if the second compressed code arranged at the end of the already generated code data and the first compressed code output from the thread is not in the predetermined relation, code data by connecting the first compressed code attached, by the identification-information attaching unit, with the identification information to the end of the already generated code data.

* * * * *